(12) United States Patent
Beuche

(10) Patent No.: US 8,729,719 B2
(45) Date of Patent: May 20, 2014

(54) COGENERATION FACILITY

(76) Inventor: Horst Beuche, Schwielowsee (DE)

(*) Notice: Subject to any disclaimer, the term of this patent is extended or adjusted under 35 U.S.C. 154(b) by 224 days.

(21) Appl. No.: 13/502,467

(22) PCT Filed: Oct. 13, 2010

(86) PCT No.: PCT/DE2010/075107
§ 371 (c)(1),
(2), (4) Date: May 10, 2012

(87) PCT Pub. No.: WO2011/044895
PCT Pub. Date: Apr. 21, 2011

(65) Prior Publication Data
US 2012/0211998 A1 Aug. 23, 2012

(30) Foreign Application Priority Data
Oct. 17, 2009 (DE) .......................... 10 2009 049 742

(51) Int. Cl.
H02P 9/04 (2006.01)

(52) U.S. Cl.
USPC ................................ 290/2; 290/40 R; 60/685

(58) Field of Classification Search
USPC ............... 290/2, 40 R; 60/685, 686, 689, 694
See application file for complete search history.

(56) References Cited

U.S. PATENT DOCUMENTS

| | | | |
|---|---|---|---|
| 4,503,337 A | 3/1985 | Hafner et al. | |
| 4,736,111 A | 4/1988 | Linden | |
| 5,903,060 A * | 5/1999 | Norton | 290/2 |
| 6,525,431 B1 * | 2/2003 | Clucas et al. | 290/2 |
| 2012/0187679 A1 * | 7/2012 | Takita et al. | 290/2 |

FOREIGN PATENT DOCUMENTS

| | | |
|---|---|---|
| DE | 2500641 A1 | 7/1976 |
| DE | 3044666 A1 | 7/1982 |
| DE | 3116624 A1 | 11/1982 |
| DE | 3333828 A1 | 4/1985 |
| DE | 4203491 A1 | 8/1993 |
| DE | 10151121 B4 | 5/2003 |
| JP | 11200951 A | 7/1999 |

OTHER PUBLICATIONS

International Preliminary Report on Patentability for corresponding International Application No. PCT/DE2010/075107 filed on Oct. 13, 2010, dated Jun. 7, 2012.

* cited by examiner

Primary Examiner — Tulsidas C Patel
Assistant Examiner — Sean Gugger
(74) Attorney, Agent, or Firm — Heslin Rothenberg Farley & Mesiti P.C.; Victor A. Cardona

(57) ABSTRACT

A cogeneration facility for supplying buildings and facilities with thermal energy and electrical energy is located in a closed enclosure, which is permanently under negative pressure during operation, wherein the negative pressure in the enclosure is controlled by a partial exhaust-gas recirculation into an intake channel of an internal combustion engine and an additional external flow resister that is provided in the closed enclosure, and a frequency converter capable of backfeed is connected to the generator in an advantageous manner. Highly efficient heat recovery is achieved, wherein heat losses are substantially minimized and, in combination with the exhaust-gas recirculation and the frequency converter capable of backfeed, very high power modulation is achieved while the exhaust-gas pollutants such as CO, HC, and $NO_x$ are simultaneously minimized.

13 Claims, 1 Drawing Sheet

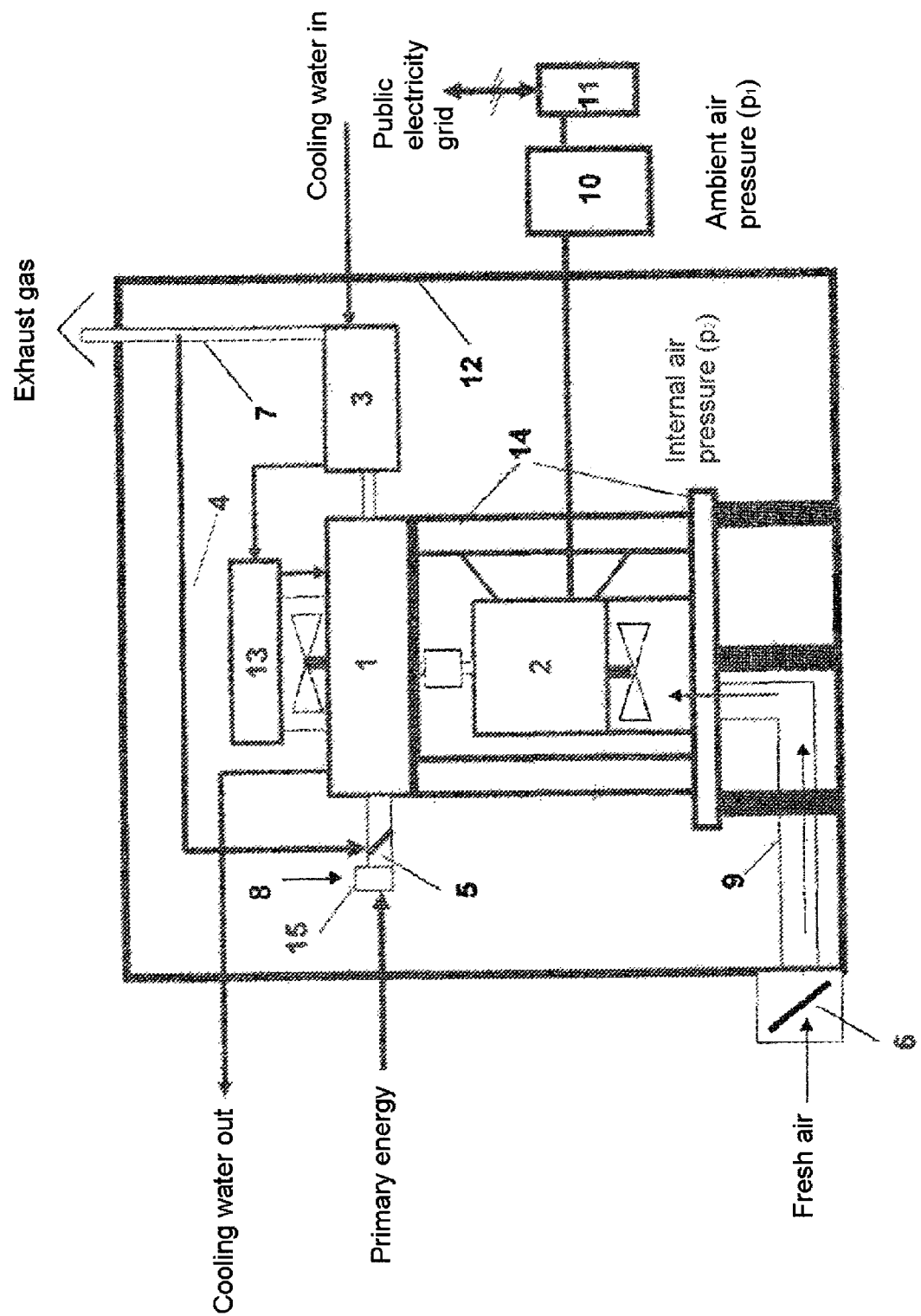

COGENERATION FACILITY

CROSS REFERENCE TO RELATED APPLICATIONS

This application is a 371 National stage of PCT International Application No. PCT/DE2010/075107 filed on Oct. 13, 2010, and published in German on Apr. 21, 2011 as WO 2011/044895 A2, which claims priority to German Application No. 10 2009 049 742.0 filed on Oct. 17, 2009, the entire disclosures of which are incorporated herein by reference.

TECHNICAL FIELD

The invention relates to a combined heat and power facility based on the technology of an engine combined heat and power plant for thermal and electrical energy supply of buildings and facilities using fossil and/or renewable primary energy.

BACKGROUND

Combined heat and power plants (referred to as CHP plants below) of the type mentioned above are known in different variants, for example from the documents listed below
  DE 33 33 828 A1
  DE 25 00 641 C2
  DE 31 16 624 C2
  DE 4 203 491 A1
  DE 3 044 666 A1

These plants are based on internal combustion engines, which are coupled to electrical generators and are operated in housings which practically communicate with the atmosphere surrounding them and are thus at atmospheric pressure inside.

These housings are used primarily for thermal and sound insulation of the CHP plant, in order to achieve the highest possible degree of utilisation of the primary energy used and of the waste heat while at the same time keeping sound emissions as low as possible.

A particularly efficient solution for a thermal and sound-insulating housing of a CHP plant is also known from DE 101 51 121 B 4. In contrast to the solutions already generally known, in this case an airtight casing which is resistant to overpressure is provided in addition to the thermal and sound insulation. This casing is then constantly subjected to an elevated internal pressure using the generator fan propeller or an additional fan/compressor. As a result of the airtight housing, no warm internal air can escape from the housing. Thermal losses in connection with the thermal insulation can thereby be minimised. The disadvantage of this solution however consists in that, as a result of the elevated internal pressure according to the invention, absolute airtightness of the casing must be achieved, otherwise warm internal air can escape permanently into the surrounding atmosphere and thus additional thermal losses occur.

For the manufacture of such an airtight and pressure-resistant casing including the necessary pipeline holes for the primary energy, cooling water feed and return lines, exhaust gas line, electrical cables and control cables, this means a high level of technological complexity, with corresponding manufacturing costs.

The invention is then based on the object of specifying a further improved housing for a CHP plant, having a more effective thermal and sound insulation effect, which ensures the best possible utilisation of the primary energy used and an even more efficient utilisation of the waste heat of the internal combustion engine and of the generator and in the process manages with minimal investment and operating costs.

SUMMARY

According to the invention, the object is achieved by a housing according to the features of claim 1. Advantageous developments of the invention can be found in dependent claims 2 to 6.

The core of the invention is a CHP plant, which is enclosed by a thermally and sound insulating casing which is hermetically well, but not necessarily completely, sealed. The solution according to the invention differs from previously known housings, in particular from DE 101 51 121 B 4, inter alia, in that it operates in the operating mode with a relatively slight underpressure inside the housing compared to the environment. This type of operation ensures that the housing surrounding the CHP plant does not have to be 100% airtight and at the same time stable and resistant to an overpressure prevailing inside.

The implementation according to the invention is achieved by designing the CHP plant and the housing preferably with a cylindrical shape, as a result of which simple manufacture is ensured along with efficient resistance to underpressure.

In this case it is important that the casing has an air supply opening with an integrated flow resistance. The main portion of the combustion air needed for the internal combustion engine passes into the housing via this preferably controllable feed air opening. The generator is at the same time cooled with this fresh air.

As the internal combustion engine in principle operates as an aspirated engine, the flow resistance, which is for example designed as a variable external throttle valve, can be used to set and regulate the underpressure in the casing. As the housing or casing is always subjected according to the invention with an underpressure, no warm air flows out. No heat losses due to undesirable transport of warm air to the outside can occur in this manner.

The underpressure desired in each case in the housing can be set precisely by the interaction of the generally customary engine throttle valve of the carburettor with the additionally provided variable flow resistance. As well as the power control of the engine, the lambda value as a measure of the quality of the combustion can be regulated very well by setting the ratio of the internal suction pressure of the engine (internal cylinder pressure during the intake stroke) to the underpressure in the casing. Owing to the large volume of the housing compared to the engine displacement, the housing acts as a store and, in conjunction with the variable flow resistance, as a damping member and thereby sustainably improves the regulation results relating to the lambda value.

A further advantageous and efficient possibility of controlling the underpressure conditions in the housing and thus the power of the internal combustion engine while at the same time improving the exhaust gas quality consists in additionally connecting an exhaust gas feedback directly downstream of the carburettor throttle valve and upstream of the engine inlet valve. By means of the externally arranged throttle valve of the housing, which now virtually acts as an engine throttle valve displaced to the outside, the reduction of the internal pressure in the casing can be used in a targeted manner in conjunction with the exhaust gas feedback for the desired regulation of the power of the internal combustion engine. At the same time, the efficiency of the internal combustion engine, in particular in partial load mode, is thereby increased and a clear reduction in CO, HC and $NO_x$ values and soot formation is achieved. Moreover, the requirement for mechanical resistance of the housing to an excessively high internal underpressure/vacuum can in this manner be decisively reduced.

In addition to the power control by means of the throttle valve, the rotational speed of the CHP plant can be regulated using a frequency converter by coupling the internal combustion engine to a robust and inexpensive asynchronous generator and also connecting a network-parallel and regenerative frequency converter to the CHP plant housed according to the invention. This ultimately results in a substantially wider power bandwidth compared to pure choke operation. As a result, a highly efficient CHP plant which modulates power within wide ranges and is particularly low in pollutants due to the exhaust gas feedback is produced. A further advantage of the frequency converter consists in that an optimal network adaptation of the asynchronous generator is made possible by means of cos-phi setting. The CHP plant according to the invention can thereby be used anywhere where conventional gas, oil or solid fuel heating is currently still installed. The solution according to the invention reduces the quantity of primary energy to be used to generate heat and electricity in the long term and thus makes a substantial contribution to $CO_2$ reduction.

BRIEF DESCRIPTION OF THE DRAWING

The invention shall be explained in more detail below using an exemplary embodiment. The accompanying drawing shows the schematic diagram of the combined heat and power facility as proposed.

DETAILED DESCRIPTION OF THE DRAWING

The primary energy and the preheated combustion air 8 are supplied to the internal combustion engine 1 in a known manner by means of the carburettor 15 and the engine throttle valve 5. The internal combustion engine can be designed as a gas, petrol or diesel engine or as a turbine. The use of a fuel cell is likewise possible.

The internal combustion engine 1 and the generator 2 are arranged in a thermally and sound insulating housing 12, which is however not completely airtight to the outside. The fresh air needed for the operation of the internal combustion engine is supplied from the outside via the external throttle valve 6, which is part of the housing 12, and, after it has cooled the electrical generator 2, passes as preheated intake air 8 via the fresh air duct 9 to the carburettor 15.

An internal pressure $p_2$ which is reduced compared to the free atmosphere $p_1$ is produced in the housing 12 due to the suction effect of the internal combustion engine 1 by the supplied quantity of fresh air being regulated with the aid of the external throttle valve 6, the level of this reduced internal pressure being influenced and controlled in a targeted manner with the aid of the external throttle valve 6. The warm internal air cannot penetrate outwards, but rather is used for efficient thermal recovery, due to the reduced internal pressure $p_2$ which prevails permanently in the housing 12 during operation. Flow-induced heat losses are thus ruled out.

In addition to the external throttle valve 6, control of the reduced internal pressure in the housing 12 is further realised by means of an exhaust gas feedback 4, which is connected to the intake duct of the internal combustion engine 1. At the same time, a reduction in exhaust gas pollutants and an improvement in the partial load efficiency of the internal combustion engine 1 is achieved thereby.

The generator 2 is connected to the domestic network and the public supply network by means of a regenerative frequency converter 10 and the electrical energy meter 11. The generator, which is preferably designed as an asynchronous machine, is also used to start the CHP plant by means of the frequency converter.

The air heated by the heat radiated by the internal combustion engine 1 is conveyed from the fan propeller of the internal combustion engine 1 through the air/water cooler 13 in the circuit and in the process cooled down, as a result of which overheating inside the housing and thus shutdown of the CHP plant is prevented.

The hot combustion gases of the internal combustion engine 1 are fed to a combustion heat cooler 3 in a known manner. The then greatly cooled exhaust gases pass by means of the exhaust into the open, a small portion of the said exhaust gases being fed in a metered manner by means of the exhaust gas feedback 4 to the gas/air mixture downstream of the throttle valve 5 inside the engine for the purpose of raising the cylinder suction pressure. In diesel engines, the fed back exhaust gas is mixed directly with the intake air.

To cool the CHP plant, the cooling water flows through the exhaust gas cooler 3, the internal combustion engine 1 and the air/water cooler 13 and can be extracted as a hot cooling water return flow, usable e.g. for heating purposes.

As all the CHP plant elements are enclosed in the thermally insulated housing 12 and no warm air can escape in an uncontrolled manner to the outside, there are minimal thermal losses. A further advantage of the facility according to the invention is produced by the introduction of the external throttle valve 6 in conjunction with the exhaust gas feedback 4 in that the combustion quality of the engine exhaust gas can be regulated very well.

A power variation by means of the now possible variable rotation speeds of the CHP plant can be achieved efficiently, and in addition to the generally customary influence of power by means of engine choking, by the generator 2 being coupled to a regenerative frequency converter 10. The generally known rigid network coupling of the generator 2 can thus be disconnected in an electronic manner by means of the frequency converter. The CHP plant can thus be operated in a speed-varied and highly efficiently power-modulating manner and in the optimal cos-phi range.

The facility according to the invention differs from the already known CHP plants of conventional construction by the housing which is permanently subjected to a controlled underpressure. Heat losses are largely minimised thereby, a very high power modulation being achieved while at the same time exhaust gas pollutants such as CO, HC and $NO_x$ are minimised with the combination of the exhaust gas feedback and the regenerative frequency converter.

LIST OF REFERENCE SYMBOLS

1 Internal combustion engine
2 Generator
3 Exhaust gas combustion heat cooler
4 Exhaust gas feedback
5 Throttle valve, internal combustion engine
6 External flow resistance/throttle valve
7 Exhaust
8 Warm intake air
9 Fresh air duct
10 Regenerative frequency converter
11 Electrical meter
12 Housing
13 Air/water heat exchanger
14 -
15 Carburettor

The invention claimed is:

1. A combined heat and power facility for supplying building and facilities with thermal and electrical energy using fossil primary energy and/or regenerative energy, comprising an air-cooled internal combustion engine and an air-cooled generator coupled thereto, which are arranged in a closed, thermally and sound insulating housing, wherein said housing is permanently subjected to a controlled internal pressure $p_2$ which is reduced compared to a pressure $p_1$ of an ambient atmosphere, and the reduced internal pressure $p_2$ is controlled by a partial exhaust gas feedback, and a quantity of supplied fresh air for operating the internal combustion engine is controlled, wherein the quantity of fresh air is supplied via an additional flow resistance arranged externally on the housing.

2. The facility according to claim 1, wherein a connection between the generator and a public electricity network is electronically decouplable and the generator is connected via a regenerative frequency converter to a domestic network and to the public electricity network.

3. The facility according to claim 1, wherein the exhaust gas feedback is connected to an intake duct of the internal combustion engine.

4. The facility according to claim 1, wherein the quantity of fresh air which first cools the generator and passes as preheated combustion air to the internal combustion engine is supplied via a fresh air duct which is connected to the external flow resistance.

5. The facility according to claim 1 wherein only the internal combustion engine is arranged in the insulated housing which is subjected to the reduced internal pressure $p_2$.

6. The facility according to claim 1 wherein the housing is cylindrical.

7. The facility according to claim 2 wherein only the internal combustion engine is arranged in the insulated housing which is subjected to the reduced internal pressure $p_2$.

8. The facility according to claim 3 wherein only the internal combustion engine is arranged in the insulated housing which is subjected to the reduced internal pressure $p_2$.

9. The facility according to claim 4 wherein only the internal combustion engine is arranged in the insulated housing which is subjected to the reduced internal pressure $p_2$.

10. The facility according to claim 2 wherein the housing is cylindrical.

11. The facility according to claim 3 wherein the housing is cylindrical.

12. The facility according to claim 4 wherein the housing is cylindrical.

13. The facility according to claim 5 wherein the housing is cylindrical.

* * * * *